Patented Dec. 26, 1939

2,184,320

UNITED STATES PATENT OFFICE 2,184,320

TREATMENT OF GLASS FIBERS

Donald C. Simpson, Newark, Ohio, assignor, by mesne assignments, to Owens-Corning Fiberglas Corporation, a corporation of Delaware No Drawing. Application March 10, 1937, Serial No. 130,147

9 Claims. (Cl. 91—68)

My invention relates to fibers consisting of alkali glass or the like and in general to an accumulation of glass fibers in mass form known as glass wool, fabricated into mats, bats, modulated wools, webs, fillers, fabrics, yarns, textiles or other forms of glass fibers; and more particularly to a surface treatment of the glass fibers serving to prevent deterioration, and premature destruction of the fibers.

When mats or the like made from glass or siliceous wools having an alkali component, are handled, the individual fibers of which they are composed fracture readily, destroying the resiliency of the mat and greatly multiplying the number of fiber ends. These cause physical discomfort if they are coarse enough and are otherwise objectionable for various reasons.

I have found, by experimentation, that the use of ordinary lubricating material does not permanently or even semi-permanently overcome the above noted difficulty. For example, a quantity of glass wool mats treated with the ordinary types of lubricants have been made up. Immediately after they were manufactured, these mats were found to possess a much superior resiliency and the fibers themselves seemed to have a greater strength than untreated fibers. The lubricating material between the fibers served to permit the slivers to slip past one another without seizure or scratching and thus materially reduce fracture and multiplication of ends. I have found, however, that after the material had been in storage for a period of a short time, such as a week, these desirable properties were lost and the material returned to the objectionable state above described.

In analyzing the situation, I have discovered that the presence of alkali in the glass, particularly in percentages above two or three percent, causes a gradual deterioration and weakening of the fibers. The alkali tends to leach to the surface and etch the glass fibers. Moreover, the presence of the alkali in this form on the surface of the fibers prevents the lubricant from wetting the surface of the fibers and thus prevents or destroys the lubricating effect. As a result the fibers on mutual contact scratch and seize one another and thus mutually cause their destruction. The surfaces become roughened and covered with fissures and cracks where stresses are concentrated.

When glass fibers manufactured from a glass containing soda ($Na_2O$) or similar alkali, such as potash or the like, are exposed to moisture, there is a tendency for the moisture to react with the alkali on or near the surface of the glass to form sodium hydroxide or similar alkali hydroxide solution. This alkali solution has a tendency to dissolve some of the glass exposed on the surface, forming an etched or pitted surface. This action is progressive, for as additional alkali is leached to the surface, the concentration of the alkali solution is increased and the attack becomes greater. A temperature cycle has been found to materially increase this destructive action by alternately causing moisture to condense and evaporate, thereby first leaching alkali to the surface and then concentrating the solution to the point where it actively etches the glass.

In ordinary bodies of glass, such as bottles or the like, this problem of self-destruction is not ordinarily encountered since there are relatively few square inches of surface, say forty square inches to a pound of glass, and most of the glass is a substantial distance from the surface. However, when glass is attenuated into long, fine fibers, the surface area is vastly increased until a pound of glass would present a surface area of the order of magnitude of a thousand square feet of exposed surface. Not only is the surface area increased but in addition the distance for the alkali to travel to leach to the surface is rendered extremely small, the greatest distance, of course, being the radius of the fiber which may be but a few microns or even less. It, therefore, is a problem of primary importance to minimize the effect of this insidious action caused by the combination of moisture with the alkali on the surface of the glass fibers or other forms of glass where the ratio of surface to volume is extremely high.

I have found that certain chemicals may be used which will prevent, inhibit or neutralize this phenomenon. By coating or covering the surface of the glass with about two or three percent acid, more or less as desired, it is possible to neutra'ize alkali ingredients which leach to the surface of the glass and thereby prevent or inhibit the destructive action of the alkali. These chemicals can be inorganic or organic compounds and can be applied in several manners. They may be applied (1) by spraying solutions of acid upon the surface; (2) by fuming or applying chemicals in the gaseous form to the surface; or (3) by app'ying salts to the surface of the glass that will decompose, yielding a neutralizing substance which combines with the alkali hydroxide, or free alkali. Thus, broadly, one phase of my invention consists primarily in the application of an acid, or a free acid radical, or a neutralizing salt, to the surface of an alkali glass which will neutralize the free alkali on the surface of the glass and the alkali which will leach to the surface thereof during its commercial life. The invention also more specifically includes the methods of applying the acid radicals and various novel compositions achieving the desired results.

Examples of acids which may be used satisfactorily to neutralize the alkali attack, although this invention is not limited thereto, are: muriatic or hydrochloric acid, sulphuric acid, nitric acid, acetic acid, sulphurous acid, sulphonic acid, formic acid, stearic acid, abietic acid, etc.

Examples of gases which may be used to coat the surface of the glass with a residue which will combine with the moisture to form a neutralizing medium, although the invention is not limited thereto, are sulphur dioxide, carbon dioxide, hydrogen chloride, chlorine, etc.

As examples of the salts which may be applied to the surface of the fibers in order to neutralize the free alkali thereof, although the invention is not limited thereto, I may use ammonium chloride, ammonium sulphate, ammonium nitrate, ammonium stearate, and other salts of ammonium or similar chemicals, aluminium sulphate, aluminium chloride and other similar salts.

In the manufacture of fibrous glass, it has been found advantageous to coat the surface of the fibers with a lubricating medium to minimize friction and abrasion between the individual fibers. The lubricating medium being water-repellent, has the further advantage of reducing the tendency for condensing of moisture upon the fiber surfaces. This lubricating medium may be an oil, grease, or other oleaginous substance. This lubricating medium is preferably applied in the form of an emulsion to aid in the even distribution and application of the medium to the surface of the fibers. I have discovered that when a small quantity of acid is added to the lubricating medium with which the glass fibers are impregnated or coated, the fabricated glass articles manufactured from such fibers retain the lubricating effect and the desirable characteristics attended therewith for a much longer period of time. Whereas the free alkali would ordinarily prevent the lubricating medium from wetting the surface of the fibers and thus prevent a uniform coating by the lubricant, the acid serves to combine with the alkali forming salts thereof, and thus permits the lubricating medium to perform its function properly. Such lubricating effect and characteristics may thus be retained, for example, the length of time which may be commercially required for storage, transit and final installation or application at the point of use. For certain types of insulation such as house insulation, a year may be considered commercially permanent.

I have also found that the acids may be applied by spraying on to the fibrous material before the lubricating medium is applied. This allows the acid to neutralize the surface alkali, and the lubricating medium may then be sprayed or applied over this treated surface. Certain of the acids may also be added to the emulsion of the lubricating medium and can be applied to the surface simultaneously.

In practicing my invention, very satisfactory results have been attained by combining with a lubricating oil, a certain amount of organic acid or the like, such as stearic acid, abietic acid, oleic acid, formic acid or the like, the treating material being compounded as an example in the following manner:

Solid stearic acid or the like is added to boiling water and stirred. This material melts and mixes with the water. Ammonia is then added and combined with the stearic acid to form ammonium stearate. The oil is then added, the ammonium stearate forming an emulsifying agent, and the mixture is stirred to form the finished emulsion.

This emulsion is preferably applied to the glass fibers in the form of a spray during the manufacture of the wool. The spray is applied to the hot fibers immediately after they are drawn out or spun from the molten glass and while accumulating in the form of wool or other fabricated article. After the fibers are treated in this manner, they are dried by the application of heat, and the ammonia evaporated or driven off, leaving stearic acid dispersed throughout the lubricating film. The stearic acid not only serves to neutralize surface alkalinity of the fibers in the manner above pointed out, but also has the additional property of repelling water, thereby making the product moisture proof to a large extent.

The use of the emulsifying agent is also important in that it permits the small percentage of oil or the like required for lubrication to be uniformly applied and evenly distributed over the surface of the fibers. The spray of emulsion comprises minute quantities of oil which deposit themselves upon the fibers, leaving the water to be evaporated under heat. In attempting to spray a small percentage of lubricating medium, for example, one-half to two percent, uniformly into the wools during manufacture, great difficulty has been experienced. By applying the lubricant in the form of an emulsion, a much larger bulk of the treating material will adhere to the fibers, resulting in a great saving of treating material over methods heretofore in use. The use of an emulsion also serves to eliminate the fire hazard present when the oil is sprayed directly on the fibers.

An example of a formula for a suitable protective and lubricating medium, which I have employed with satisfactory results, is as follows:

| | Per cent |
|---|---|
| Stearic acid | 20 |
| C-Mineral oil (a Pure Oil Company product which is of rather heavy viscosity) | 30 |
| Ammonia | 4 |
| Triethanolamine | 2 |
| Water | 44 |

This is diluted with one or two parts of water before using. The triethanolamine is an excellent emulsifying agent and may be added to the treating mixture as an aid in obtaining a smooth emulsion, although it does not furnish the required acid radical. Other soaps or the like may also be added in order to provide the emulsifying effect.

The ammonia in the formulae, aided by the triethanolamine, not only neutralizes the stearic acid, but also raises the pH so that a stable emulsion results. The alkalinity due to the ammonia, plus triethanolamine is insufficient for this emulsion itself to etch the glass. When these emulsions are sprayed on glass, any alkali on the surface of the glass displaces ammonia, which volatilizes off, leaving the acid radical in combination with the alkali from the glass, whereby it is neutralized and rendered innocuous. Sufficient acid is present in combination with replaceable ammonia, not only to take care of the alkali already present on the surface of the glass, but also to combine with additional amounts which may be leached from the glass.

As an example, ammonium chloride can be added to the tempering emulsion. After application, the ammonium chloride reacts with the sodium hydroxide to form sodium chloride, water, and free ammonia gas. The free ammonia gas and the water pass off, leaving sodium chloride which is neutral and tends to inhibit the action of the alkali.

I have found that the use of ammonium salts is particularly advantageous for several reasons. In using ammonium salts, they react to liberate ammonia which is a gas that passes off, allowing the reaction to go to completion rather than to a balanced condition as it would if a metal salt were used, where all the ingredients remain in close association. Tests have shown that when utilizing fatty acids such as stearic acid or oleic acid or the like for the neutralization of the alkali on the surface of the glass fibers, there may not be a complete neutralization of all the alkali present, although the application does assist materially in the elimination of alkali conditions. The use of ammonium salts, however, has been found to be more satisfactory and efficient, and I use it in preference to other admixtures. The ammonium salts may be used as emulsifying agents for the lubricating medium and the water. For example, a soap consisting of ammonium stearate may be used as an emulsifying agent for an oil such as a medium heavy paraffin oil about the consistency of SAE 40 motor oil, a cylinder oil or the like, and water. In using the ammonium stearate soaps, the ammonia evaporates after application on the wool, leaving a mixture of oil and stearic acid on the wool. Other soaps can also be used as emulsifying agents, but they always remain on the wool, and therefore, can be redissolved. The ammonium soap, however, because it breaks down, forms a very waterproof lubricating medium or tempering oil for the glass fibers.

It is to be noted, however, that ammonium salts, such as ammonium stearate, break down very readily, and, in solution, if the ammonia is free to leave or be evaporated from the surface of the liquids, the emulsion will be precipitated. It is, therefore, necessary to store the emulsion or tempering oil in closed, tight containers or to maintain the ammonia concentration sufficiently high by adding ammonia from time to time.

In compounding the tempering oil, when using ammonium salts, I may adopt the following procedure: A preferable method is to heat a small portion of water with steam and then add stearic acid, which will melt, and then, while agitating the liquid, add ammonia. This forms an ammonium stearate soap solution. The oil can then be added slowly with constant agitation. The mix can now be diluted with water, but the temperature should preferably be kept above 100° F. while this is done.

Another material noted as an example, which may be used in improving the quality of the wool, is ammonium sulphate. An ordinary solution of ammonium sulphate has a pH value below 7, that is, somewhat acid, and thus when preparing an emulsion of this compound with lubricating oil, it is desirable to raise the pH by the addition of ammonia so that a stable emulsion will be produced.

From these examples it will be noted that it is highly desirable to obtain a suitable emulsifying agent which is alkaline in nature in solution before application to the glass wool, but whose alkaline constituent volatilizes when it has been applied, leaving a free acid radical to combine with the alkali on the glass. Thus by the admixture of ammonium salts I have achieved such results.

As specific examples of admixing the chemicals, I may use the following:

Mix in 44 pounds of hot water at 160° F., four pounds of concentrated ammonium hydroxide, and two pounds of triethanolamine. Then add the following oily materials that have been heated together at 150° F., namely, twenty pounds stearic acid and twenty pounds paraffin and ten pounds lubricating oil (preferably SAE 20). Ammonium sulphate solution may independently be prepared by adding ten pounds of ammonium sulphate salts to about ten gallons of water and rendering alkaline with one-half gallon of concentrated ammonium hydroxide. The ammonium sulphate solution may then be added to the first mentioned mixture and the emulsion diluted to 100 gallons with warm water.

Another emulsion that will work well is made as follows: Heat 25 gallons of water to boiling, add 20 pounds of stearic acid and while agitating, add 5 pounds of concentrated ammonium hydoxide. While agitating, add 30 pounds of cylinder oil (SAE 40) slowly. Ammonium sulphate solution made as before by intermixing 10 pounds of ammonium sulphate in 10 gallons of water and alkalinizing with one-half gallon of concentrated ammonium hydroxide, may then be added and the mix diluted to 100 gallons.

Another emulsion that may be used successfully is as follows:

| | Pounds |
|---|---|
| Mineral Oil | 50 |
| Stearic Acid | 20 |
| Ammonium hydroxide | 5 |
| Triethanolamine | 2 |
| Zinc chloride | 5 |
| Ammonium chloride or ammonium sulphate | 3 |
| Water | 600 |

If desired, the resistance of the glass wool or article made therefrom, to the passage of radiant heat, may be increased by adding to the emulsion a suitable quantity of finely divided inorganic matter. As an example, bentonite, which is a colloidal clay, or aluminum silicate, may be used. The use of an emulsifying agent makes it practical to incorporate such inorganic material with a lubricating medium. The bentonite is generally added in relatively small amounts as, for example, two or three percent. In incorporating such material, it is generally found useful to add the bentonite as, for example, six pounds to a suitable quantity of water, such as twelve gallons of water, and agitating the same to form a slurry. This method prevents lumps of bentonite coated with oil. The slurry may then be added to the emulsion to produce a concentration of bentonite ranging about two or three percent thereof in the emulsion.

Modifications of the methods above described and the materials employed, may be resorted to within the spirit and scope of my invention.

I claim:

1. The method of treating a fabricated body of fibrous glass composed in part of an alkali ingredient, which comprises applying to the surface of said fibers throughout said body, a strong inorganic acid capable of neutralizing free alkali on the surface of said fibers.

2. The method of treating a fabricated body of fibrous glass composed in part of an alkali ingredient, which includes the step of applying to the surface of said fibers throughout said body fumes of a strong inorganic acid to neutralize the free alkali on the surface of said fibers.

3. The method of treating a fabricated body of fibrous glass composed in part of an alkali ingredient, which comprises treating said glass throughout said body with an inorganic acid to neutralize the free alkali on the surface of said fibers, and then applying an oleaginous lubricant to the surface of said fibers.

4. The method of treating a fabricated body of fibrous glass composed in part of an alkali ingredient, which comprises applying a strong inorganic acid in a gaseous form to the surface of said fibers throughout said body and thereby coating the surface of the glass with a residue capable of neutralizing the alkali on the surface of said fibers throughout said body.

5. The method of treating a fabricated body of fibrous glass composed in part of an alkali ingredient, which comprises applying a strong inorganic acid in gaseous form to the surface of said fibers throughout said body and thereby coating the surface of the glass with a residue capable of neutralizing the alkali on the surface of said fibers throughout said body, and then applying an oleaginous lubricant to the surface of said fibers.

6. A fabricated body of glass fibers of glass composition having an alkali ingredient therein, the surface of the fibers throughout said body having applied thereto a strong, inorganic acid to neutralize alkali existing on or which may leach to the surface of said fibers.

7. The method of treating a fabricated body of fine attenuated fibers of glass composed in part of an alkali ingredient, which includes the step of neutralizing the alkali existing on or leaching to the surface of said fibers throughout said body by means of a strong inorganic acid and preventing the alkali from attacking said fibers.

8. The method of treating fibrous glass composed in part of an alkali ingredient, which includes the step of applying to the surface of said fibers fumes of a strong inorganic acid and causing the free alkali in the surface of said fibers to be neutralized.

9. The method of treating fibrous glass composed in part of an alkali ingredient, which includes the step of spraying the surface of said fibers with a strong inorganic acid to react with and neutralize the free alkali on the surface of said fibers.

DONALD C. SIMPSON.